(12) United States Patent
Bai (10) Patent No.: US 9,867,075 B2
(45) Date of Patent: Jan. 9, 2018

(54) MEASUREMENT DEVICE AND METHOD, AND CONTROL DEVICE AND METHOD FOR WIRELESS NETWORK

(71) Applicant: SONY CORPORATION, Tokyo (JP)

(72) Inventor: Wei Bai, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/310,677

(22) PCT Filed: May 11, 2015

(86) PCT No.: PCT/CN2015/078659
§ 371 (c)(1),
(2) Date: Nov. 11, 2016

(87) PCT Pub. No.: WO2015/176613
PCT Pub. Date: Nov. 26, 2015

(65) Prior Publication Data
US 2017/0127307 A1    May 4, 2017

(30) Foreign Application Priority Data
May 20, 2014    (CN) .......................... 2014 1 0213539

(51) Int. Cl.
*H04W 24/08*    (2009.01)
*H04W 24/10*    (2009.01)
*H04W 72/04*    (2009.01)

(52) U.S. Cl.
CPC ............ *H04W 24/10* (2013.01); *H04W 24/08* (2013.01); *H04W 72/042* (2013.01); *H04W 72/0413* (2013.01)

(58) Field of Classification Search
CPC combination set(s) only.
See application file for complete search history.

(56) References Cited

U.S. PATENT DOCUMENTS

| 8,432,991 B2 | 4/2013 | Yin |
| 2010/0034096 A1 | 2/2010 | Yin |

(Continued)

FOREIGN PATENT DOCUMENTS

| CN | 101990234 A | 3/2011 |
| CN | 103167551 A | 6/2013 |
| CN | 103220048 A | 7/2013 |

OTHER PUBLICATIONS

International Search Report dated Aug. 21, 2015, in PCT/CN2015/078659 filed May 11, 2015.

*Primary Examiner* — Cindy Trandai
(74) *Attorney, Agent, or Firm* — Oblon, McClelland, Maier & Neustadt, L.L.P.

(57) ABSTRACT

A measurement device and method, and a control device and method for a wireless network. The measurement device includes: a receiving unit configured to receive measurement configuration information containing a measurement solution for a target measurement object and coming from a control end; a measurement unit configured to conduct corresponding measurement on the target measurement object according to the measurement configuration information received by the receiving unit; and a transmitting unit configured to transmit a measurement result to the control end, wherein in response to the situation that the measurement solution contained in the measurement configuration information is a first measurement solution or a second measurement solution, the transmitting unit is configured to transmit a measurement result processed by different communication protocol layers.

18 Claims, 4 Drawing Sheets

(56) References Cited

U.S. PATENT DOCUMENTS

| | | | |
|---|---|---|---|
| 2011/0044218 A1* | 2/2011 | Kaur | H04W 72/1215 370/310 |
| 2011/0105123 A1* | 5/2011 | Lee | H04W 24/10 455/436 |
| 2011/0183661 A1* | 7/2011 | Yi | H04W 24/10 455/422.1 |
| 2012/0039365 A1* | 2/2012 | Suzuki | G01S 19/05 375/147 |
| 2012/0040673 A1* | 2/2012 | Ying | H04W 36/14 455/436 |
| 2012/0113837 A1* | 5/2012 | Siomina | H04W 24/10 370/252 |
| 2012/0178465 A1* | 7/2012 | Lin | H04W 24/10 455/450 |
| 2013/0090113 A1* | 4/2013 | Persson | H04W 24/10 455/424 |
| 2013/0201850 A1* | 8/2013 | Swaminathan | H04W 72/1215 370/252 |
| 2013/0272170 A1* | 10/2013 | Chatterjee | H04W 28/02 370/280 |
| 2013/0329583 A1* | 12/2013 | Vrzic | H04W 36/30 370/252 |
| 2014/0051428 A1* | 2/2014 | Jung | H04W 24/08 455/422.1 |
| 2014/0146732 A1* | 5/2014 | Olufunmilola | H04W 24/10 370/311 |
| 2014/0295770 A1* | 10/2014 | Song | H04W 36/0088 455/67.11 |
| 2015/0065138 A1* | 3/2015 | Chen | H04W 36/0094 455/436 |
| 2015/0126205 A1* | 5/2015 | Kim | H04W 24/10 455/450 |
| 2015/0358139 A1* | 12/2015 | Li | H04W 72/08 370/252 |

* cited by examiner

MEASUREMENT DEVICE AND METHOD, AND CONTROL DEVICE AND METHOD FOR WIRELESS NETWORK

FIELD OF THE INVENTION

The present disclosure generally relates to the field of wireless communication, and particularly to a measurement device and method and a control device and method for a wireless network.

BACKGROUND OF THE INVENTION

A mode of cellular communication is normally used in an existing wireless communication system. That is, multiple base stations are deployed by an operator to cover a region where communication is to be performed, and each of the base stations has a separate coverage range and is responsible for functions such as user scheduling, data transmission, demodulation and so on within the coverage range thereof. The 2G (GSM) communication system, the 3G (WCDMA, CDMA2000, TD-SCDMA and so on) communication system and the 4G (LTE, LTE-A) communication system have a same basic principle of cellular coverage although they are different in specific functions. In the case that a user terminal moves from a cell to another cell, it is required for the user terminal to switch between the cells to guarantee continuity of communication, since each cell has a relatively independent scheduling system and demodulation and decoding system. Channel quality is required to be measured in a process of the switch, to ensure that the switch is performed correctly.

Specifically, the user terminal measures with respect to a home cell and an adjacent cell based on configuration on a network side, processes a measurement result, and then reports the measurement result to the network side. The network side determines whether to perform cell switch based on the reported measurement result, and transmits a switch instruction in the case that the cell switch is required. The user terminal performs a switch flow upon receiving the switch instruction, and is connected to a target cell. Ping-pong effect is further to be avoided while guaranteeing switch performance. The ping-pong effect is that a user terminal is switched back and forth between two cells endlessly due to an unreasonable cell switch method or parameter, thereby seriously affecting transmission performance of the user terminal and wasting network resources.

Figure 1:
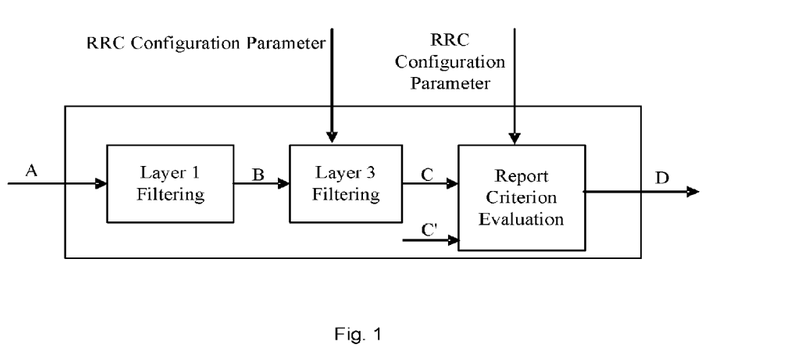
FIG. 1 is a schematic diagram of an example of a measurement model according to the prior art.

A conventional method is thus to convey measurement results in a physical layer of the user terminal to a high layer such as a Radio Resource Control (RRC) layer. The high layer filters and iterates the measurement results, and transmits a relative long-term and average measurement result to the network side to determine. FIG. 1 shows a measurement model for the conventional method in TS36.300. In FIG. 1, A is measurement values in a physical layer, the measurement values are filtered and subjected to report criterion evaluation in layer 3 after being filtered in layer 1, and then the measurement values are reported. The measurement values are averaged to some extent upon being filtered in layer 1, and the report criterion evaluation is used for checking whether it is necessary to report the measurement values. The evaluation may be also based on multiple flows at C such as C and C' for the measurement values, for example, to compare different measurement values. In addition, the report criterion evaluation can also be used for comparing the measurement result of the user terminal with a reference value to obtain a comparison result, and performing statistics on the comparison result within a time period, and for example, the measurement result is reported only in the case that the comparison result meets a condition within the time period.

The method described above can avoid the ping-pong effect. However, the method has disadvantages such as long time delay, high complexity and extra signaling overheads since processing in the high layer is required. For example, the switch flow often takes about 2 s in the 2G system, and even in the 4G system such as LTE or LTE-A in which the system is simplified greatly, the switch flow also takes at least 100 ms. Therefore, the communication requirement in a network structure which becomes even more diverse can not be met.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

A measurement device for a wireless network is provided according to an aspect of the present disclosure, and the measurement device includes: a receiving unit, configured to receive measurement configuration information containing a measurement scheme for a target measurement object from a control terminal; a measuring unit, configured to measure the target measurement object correspondingly based on the measurement configuration information received by the receiving unit; and a transmitting unit configured to transmit a measurement result to the control terminal, where the transmitting unit is configured to transmit a measurement result processed by different communication protocol layers in response to whether the measurement scheme contained in the measurement configuration information being a first measurement scheme or a second measurement scheme.

A measurement method for a wireless network is provided according to another aspect of the present disclosure, and the measurement method includes: receiving measurement configuration information containing a measurement scheme for a target measurement object from a control terminal; measuring the target measurement object correspondingly based on the received measurement configuration information; and transmitting a measurement result to the control terminal, where a measurement result processed by different communication protocol layers is transmitted in response to the measurement scheme contained in the measurement configuration information being a first measurement scheme or a second measurement scheme.

A control device for a wireless network is provided according to yet another aspect of the present disclosure, and the control device includes: a determining unit, configured to, with respect to a target measurement object and a user terminal, determine a measurement scheme of the user terminal for the target measurement object from multiple candidate measurement schemes containing a first measurement scheme and a second measurement scheme; a notifying unit, configured to notify the user terminal of measurement configuration information containing the determined measurement scheme for the target measurement object; and a receiving unit configured to receive a measurement result reported by the user terminal, where the determining unit is configured to determine the received measurement result of the user terminal in different communication protocol layers in response to the determined measurement scheme being a first measurement scheme or a second measurement scheme.

A control method for a wireless network is provided according to another aspect of the present disclosure, and the control method includes: with respect to a target measurement object and a user terminal, determining a measurement scheme of the user terminal for the target measurement object from multiple candidate measurement schemes containing a first measurement scheme and a second measurement scheme; notifying the user terminal of measurement configuration information containing the determined measurement scheme for the target measurement object; and receiving a measurement result reported by the user terminal, where the received measurement result of the user terminal is determined in different communication protocol layers in response to the determined measurement scheme being a first measurement scheme or a second measurement scheme.

A computer program code and a computer program product for implementing the measurement method and/or the control method for the wireless network described above and a computer-readable storage medium on which the computer program code for implementing the measurement method and/or the control method for the wireless network described above is recorded are provided according to other aspect of the present disclosure.

A measurement device for a wireless network is further provided in the present disclosure, and the measurement device includes a circuit which is configured to: receive measurement configuration information containing a measurement scheme for a target measurement object from a control terminal; measure the target measurement object correspondingly based on the received measurement configuration information; and transmit a measurement result to the control terminal, where the measurement result processed by different communication protocol layers is sent in response to the measurement scheme contained in the measurement configuration information being a first measurement scheme or a second measurement scheme.

A control device for a wireless network is further provided in the present disclosure, and the control device includes a circuit which is configured to: with respect to a target measurement object and a user terminal, determine a measurement scheme of the user terminal for the target measurement object from multiple candidate measurement schemes containing a first measurement scheme and a second measurement scheme; notify the user terminal of measurement configuration information containing the determined measurement scheme for the target measurement object; and receive a measurement result reported by the user terminal, where the received measurement result of the user terminal is determined in different communication protocol layers in response to the determined measurement scheme being a first measurement scheme or a second measurement scheme.

In the measurement device and method and the control device and method according to the present disclosure, different measurement schemes for processing in different communication protocol layers can be selected based on a property of the target measurement object and a property of the user terminal, thereby reducing processing cost as much as possible and improving transmission performance in the case of there being multiple network architectures.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

Figure 2:
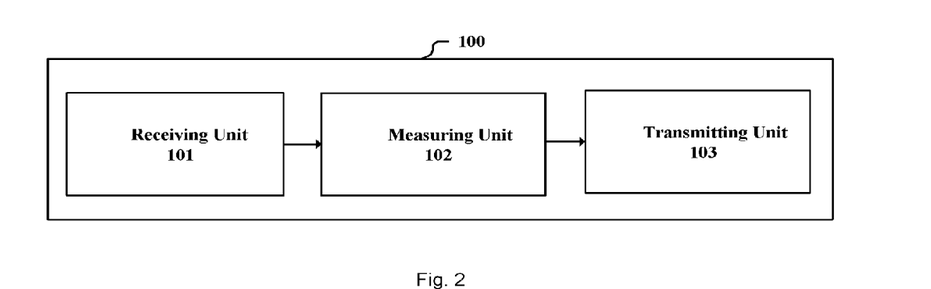
FIG. 2 is a structural block diagram of a measurement device according to an embodiment of the present application.

FIG. 2 is a structural block diagram of a measurement device 100 for a wireless network according to an embodiment of the present application. The measurement device 100 includes: a receiving unit 101, configured to receive measurement configuration information containing a measurement scheme for a target measurement object from a control terminal; a measuring unit 102, configured to measure the target measurement object correspondingly based on the measurement configuration information received by the receiving unit 101; and a transmitting unit 103, configured to transmit a measurement result to the control terminal. The transmitting unit 103 is configured to transmit a measurement result processed by different communication protocol layers in response to the measurement scheme contained in the measurement configuration information being a first measurement scheme or a second measurement scheme. The measurement device 100 for example can be included a user device or a device connected to the user device. In particular, for example, the measurement device 100 may be the user device itself or a processing circuit in the user device. The user device may include but be not limited to a smart terminal such as a mobile phone, a tablet computer, a laptop computer, a smart glass and a smart watch having a function of cellular communication, or a vehicle such as a car.

In the case that the measurement device 100 needs to measure a target measurement object, the receiving unit 101 first receives, from a control terminal, measurement configuration information containing a measurement scheme for the target measurement object, then the measuring unit 102 measures the target measurement object based on the measurement configuration information, and the transmitting unit 103 transmits a measurement result. The measurement result is processed in different communication protocol layers for different measurement schemes specified by the measurement configuration information. The measuring described here may refer to for example Radio Resource Management (RRM) measurement.

It can be understood that since the measurement result is processed in different communication protocol layers, a process of reporting the measurement result has different processing time periods/different computing complexity. A suitable processing way for the measurement result is selected in response to requirements of different network structures, thereby properly improving the processing efficiency.

The measurement configuration information received by the receiving unit 101 may be included in a downlink control signaling from the control terminal. The downlink control signaling is for example RRCConnectionReconfiguration message in the LTE system. As a specific example, the measurement configuration information may be measConfig information element in the LTE system. More specifically, measConfig includes information suitable for a particular measurement object, for example, MeasObjectEUTRA information element. Information on the measurement scheme in the present disclosure may be included in for example MeasObjectEUTRA.

The measurement configuration information containing the measurement scheme includes a measurement scheme identifier for indicating the measurement scheme to be applied. As an example, the measurement scheme identifier includes a measurement type for the target measurement object indicating the measurement scheme. The first measurement scheme is determined to be used when the measurement type for the target measurement object is in a first type, and otherwise the second measurement scheme is determined to be used.

For example, when the measurement scheme identifier may include a field which can take a value of "Normal" or "Light", it is agreed on that the second measurement scheme is used if the field takes the value of "Normal", and the first measurement scheme is used if the field takes the value of "Light". In addition, it can also be agreed on that a default value of the field may be set to "Normal", for example. Of course, the default value can also be set to "Light". The field may be set for example as ObjectType field in the case that the measurement scheme information is carried in the MeasObjectEUTRA information element described above.

As an example, if the measurement scheme is the first measurement scheme, the measuring unit 102 is configured not to provide the measurement result to an upper layer above a physical layer to process, and the transmitting unit 103 is configured to acquire, from the measuring unit 102, the measurement result not processed by the upper layer and transmit the measurement result to the control terminal. Specifically, at least one of processing as follows may be not performed on the measurement result: filtering/iteration in the upper layer, comparison with a reference value or other measurement value and running a timer which is triggered to report, for example, a TTT (TimeToTrigger) timer. In such a situation, a time period required by the processing can be greatly reduced. In this case, for example, the measuring unit 102 may measure at least one of a signal-to-noise ratio (SNR), a signal-to-noise and distortion ratio (SNDR), a signal to interference plus noise power ratio (SINR) of a signal in a frequency where the target measurement object works on. The measurement result may be a quality index generated based on SNR, SNDR or SINR. As a specific example, the measurement result can be indicated by a Channel Quality Indicator (CQI).

If the measurement scheme is the second measurement scheme, the measuring unit 102 is configured to provide the measurement result to a high layer above a physical layer to process, and the transmitting unit 103 is configured to acquire, from the measuring unit 102, the measurement result processed by the high layer and transmit the measurement result to the control terminal. Specifically, the measuring unit 102 can measure a power of a signal in a frequency where the target measurement object works on, the measurement result can be indicated by for example a Reference Signal Receiving Power (RSRP) or a Reference Signal Receiving Quality (RSRQ).

For example, with the measuring device 100 described above according to the present disclosure, a suitable measurement scheme can be determined by a control terminal on the network side based on the actual situation such as the network architecture or the like with respect to the measurement performed when switching between cells, so that processing in the high layer above the physical layer is not performed on the measurement result where appropriate, such as filtering in layer 3 and the report criterion evaluation as shown in FIG. 1, thereby reducing the time delay and improving the switch efficiency.

Although it is pointed out above that the processing in the high layer above the physical layer is not performed in the first measurement scheme, at least part of the processing in the high layer may also be performed. For example, only the filtering in layer 3 or the report criterion evaluation in FIG. 1 is performed. As another example, only comparison with the reference value may be performed in the report criterion evaluation.

It should be understood that, only one measurement example is shown here, and the application scenario where the measurement device 100 can be applied is not limited thereto.

In addition, in the case that the measurement scheme is the first measurement scheme, the receiving unit 101 is further configured to receive, from the control terminal, configuration information on a physical channel for transmitting the measurement result, and the transmitting unit 103 is further configured to transmit the measurement result through the physical channel configured by the control terminal.

Specifically, the configuration information on the physical channel may be transmitted by the control terminal separately, or may be included in the measurement configuration information to be transmitted.

In an embodiment, the control terminal configures the physical channel for example by a high-layer signaling such as a RRC signaling. The user terminal can use the configured physical channel continuously until another next configuration is performed. The physical channel may include at least one of a Physical Uplink Control Channel (PUCCH) in the LTE system and an uplink dedicated physical control channel (UL-DPCCH) in the Universal Mobile Telecommunications System (UNITS).

Alternatively, rather than configuring a dedicated physical channel for the user terminal, the control terminal schedules a physical data channel such as a Physical Uplink Shared Channel (PUSCH) for transmitting the measurement result of the user terminal of a certain time by using information on the Physical Downlink Control Channel (PDCCH), so that the user terminal can transmits the measurement result of this time by using the scheduled physical channel resource. It should be understood that the scheduled channel resource may be changed successively.

In the case that multiple target measurement objects are to be measured, the measurement device 100 receives, from the control terminal, information on measurement schemes for respective target measurement objects respectively, and measures the multiple target measurement objects based on their respective measurement schemes. In the case that the measurement scheme is the first measurement scheme, the transmitting unit 103 may be configured to transmit all measurement results or optionally transmit a part of measurement results to the control terminal. As an example, in the case that the measurement scheme is the first measurement scheme, the transmitting unit 103 may be configured to transmit measurement results of all of the multiple target measurement objects to the control terminal sequentially; or, the transmitting unit 103 may be configured to transmit a measurement result of a target measurement object having the best communication quality to the control terminal.

In another aspect, in the case that the measurement scheme is the second measurement scheme, the transmitting unit 103 can be configured to transmit a measurement result contained in a high-layer signaling through the physical data channel. It is suitable to transmit the measurement result through the physical data channel especially when a large amount of data is generated using the second measurement scheme.

In summary, in the case that the measurement scheme is the first measurement scheme, the user terminal reports the measurement result to the control terminal by the physical-layer signaling. In the case that the measurement scheme is the second measurement scheme, the user terminal reports the measurement result to the control terminal by the high-layer signaling. From another viewpoint, in the case that the measurement scheme is the first measurement scheme, the user terminal does not perform Forward Error Correction (FEC) on the measurement result before reporting the measurement result to the control terminal, and does not use a Hybrid Automatic Repeat Request (HARQ) mechanism in a process of reporting the measurement result. In the case that the measurement scheme is the second measurement scheme, the user terminal performs the FEC on the measurement result before reporting the measurement result to the control terminal, and uses the HARQ mechanism in the process of reporting the measurement result. In another embodiment, the transmitting unit 103 is further configured to transmit information on capability of the user terminal corresponding to the measurement device to the control terminal, and the measurement configuration information received by the receiving unit 101 may be determined by the control terminal at least based on the information on the capability of the user terminal.

The capability of the user terminal may refer to for example whether the user terminal can support a selection among multiple measurement schemes and whether the user terminal can support a certain measurement scheme.

As an example, the target measurement object is a carrier. When the control terminal determines that a target network operation type corresponding to the target measurement object is a type that baseband processing units are centralized and transceiver units are distributed for multiple carriers, and the information on the capability of the user terminal described above indicates that the user terminal can support a measurement scheme related to the target network operation type, the measurement scheme contained in the measurement configuration information received by the receiving unit 101 is the first measurement scheme if the target measurement carrier and a current serving carrier of the user terminal are located in a same baseband processing unit. Otherwise, the measurement scheme contained in the measurement configuration information received by the receiving unit 101 is the second measurement scheme. The control terminal can acquire the required related information by itself when determining the target network operation type.

Figure 3:
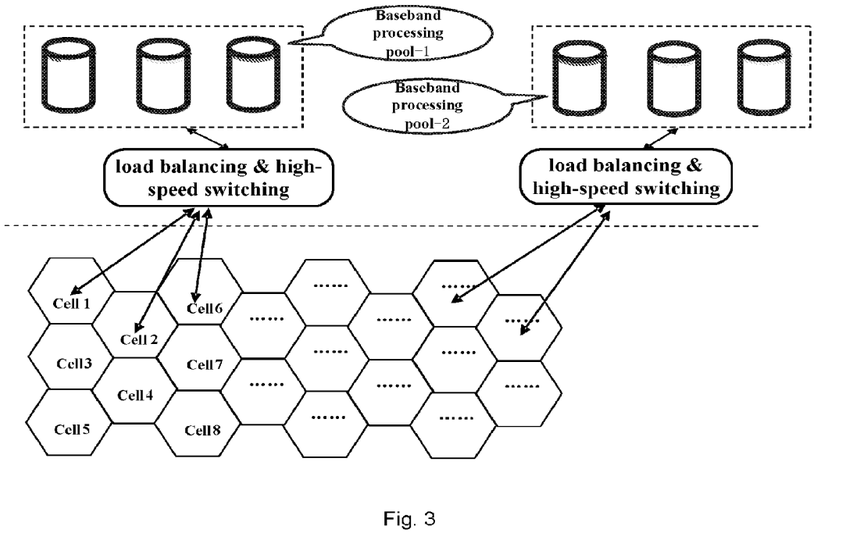
FIG. 3 is a schematic diagram of C-RAN deployment.

Specifically, a basic principle of the network operation type that the baseband processing units are centralized and the transceiver units are distributed for multiple carriers lies in: baseband processing parts of traditional cells are centralized, cell resources scheduling, demodulation and decoding are performed in a way similar to cloud computing, and only a corresponding transmitting/receiving antenna is deployed in coverage of each of the traditional cells. Such a network configuration can reduce a construction cost and a maintenance cost of the system significantly, thereby improving system performance. A specific example may be for example a way of C-RAN. FIG. 3 shows a schematic diagram of C-RAN deployment, in which, for example, cell 1, cell 2 and cell 6 share a baseband processing pool 1 together.

It can be seen that, in the case that a network in which the baseband processing units are centralized and the transceiver units are distributed for multiple carriers is used to communicate, for example, when a user terminal moves between cells, such as the case that the user terminal moves from the cell 1 to the cell 2 in FIG. 3, a current service carrier of the user terminal is a carrier 1 corresponding to the cell 1 and a target measurement carrier of the user terminal is a carrier 2 corresponding to the cell 2. Since the carrier 1 and the carrier 2 are located in the same baseband processing unit, i.e. the baseband processing pool 1, that is, user scheduling and demodulation and decoding in the cell 1 and the cell 2 are both performed by the baseband processing pool 1, the switch of the user terminal between the carrier 1 and the carrier 2 may be regarded as an alteration of a wireless resource or a change in a wireless channel condition. In this situation, the first measurement scheme can be used, for example, the measurement result is processed only in the physical layer, thereby reducing a time delay for measuring, and improving validity of the measuring to ensure effective utilization for a resource of the system.

In addition, the above mentioned ping-pong effect is no longer an unfavorable factor for the network in which the baseband processing units are centralized and the transceiver units are distributed for multiple carriers. On the contrary, a greater frequency selective gain can be acquired in a centralized scheduling by making use of an instantaneous change in the channel. In other words, since the switch between carriers in the same baseband processing unit is just the physical switch of wireless resources, a wireless resource having the best communication quality can be selected more rapidly and flexibly. In order to realize the object, the measurement device 100 according to the present disclosure can enable measuring to be rapider by selecting the first measurement scheme, and avoid unnecessary computational overheads.

In the case that the measurement scheme is the first measurement scheme, the receiving unit 103 is further configured to receive auxiliary measurement information from the control terminal. The auxiliary measurement information can assist the user terminal in measuring, for example, to improve a measuring rate and so on. The auxiliary measurement information may include at least one of the following: a type of wireless access technology for the target measurement object, an ID of a cell corresponding to the target measurement object and time-frequency information of a synchronous channel or a searching channel of the target measurement object. It should be understood that the auxiliary measurement information is not limited thereto.

Specifically, the type of the wireless access technology for the target measurement object includes but is not limited to the LTE, the LTE-A, the UMTS, the GSM and the CDMA2000. The time-frequency information of the synchronous channel or the searching channel of the target measurement object includes but is not limited to a time-frequency difference of the synchronous channel or the searching channel in relative to the current serving cell. The control terminal can provide the time-frequency information due to the adoption of the centralized-control manner, and the synchronous channels of all the frequencies are known to the control terminal. The time-frequency difference may be used to determine a measurement gap, and the measuring unit 102 readjusts an antenna of the user terminal based on the measurement gap, and performs measuring. Specifically, the user terminal is required not to transmit or receive any other information within the measurement gap. Similarly, the target measurement object described here may be a carrier, but is not limited thereto.

In a traditional measurement way, the measurement gap is a fixed value, and is set to be big enough, so that the measuring unit can capture the synchronous channel or the searching channel. In the embodiment of the present disclosure, the measurement gap can be changed dynamically based on the time-frequency information provided by the control terminal, thereby improving the measuring efficiency as much as possible.

In addition, in the case that the measurement scheme is the first measurement scheme, the receiving unit 101 may also be configured to receive, from the control terminal, the measurement gap set by the control terminal based on the time-frequency information of the synchronous channel or the searching channel of the target measurement object.

In another aspect, when the information described above indicates that the target network operation type is not the type that the baseband processing units are centralized and the transceiver units are distributed for multiple carriers, and/or the user terminal can not support the measurement scheme related to the target network operation type, the measurement scheme contained in the measurement configuration information received by the receiving unit 101 is the second measurement scheme.

Specifically, the second measurement scheme is used in the case that the target network operation type is a traditional type or the user terminal can not support the first measurement scheme.

Similarly, the measuring unit 102 may be configured to measure the multiple target measurement objects respectively based on the corresponding measurement schemes. In the case that the measurement scheme is the first measurement scheme, the transmitting unit 103 may transmit the measurement result in various ways described above, or the transmitting unit 103 may preferentially transmit for example a measurement result of the current serving carrier of the user terminal.

In summary, the measurement device 100 can receive the measurement scheme selected for a condition of different networks and different user terminals, and measure the target measurement object correspondingly, thereby reducing a time delay of measurement report and computing complexity, and improving network performance. In addition, since the measuring rate can be improved, the server continuity for a user at an edge of the cell can be raised, and service experience of the user can be improved.

Figure 4:
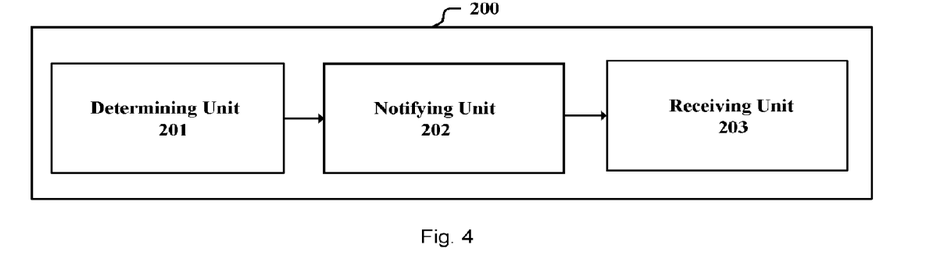
FIG. 4 is a structural block diagram of a control device according to an embodiment of the present application.
Figure 5:
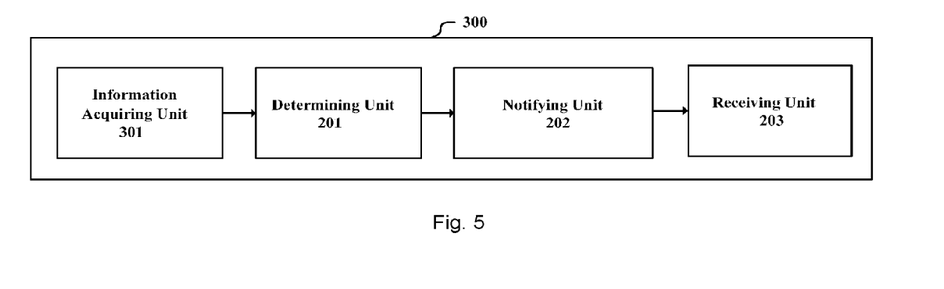
FIG. 5 is a structural block diagram of a control device according to another embodiment of the present application.

A control device 200 and a control device 300 for a wireless network on the network side are described blow with reference to FIG. 4 and FIG. 5.

As shown in FIG. 4, the control device 200 includes: a determining unit 201, configured to, with respect to a target measurement object and a user terminal, determine a measurement scheme of the user terminal for the target measurement object from multiple candidate measurement schemes containing a first measurement scheme and a second measurement scheme; a notifying unit 202, configured to notify the user terminal of measurement configuration information containing the determined measurement scheme for the target measurement object; and a receiving unit 203, configured to receive a measurement result reported from the user terminal. Specifically, the determining unit 201 is configured to determine the received measurement result of the user terminal in different communication protocol layers in response to the determined measurement scheme being a first measurement scheme or a second measurement scheme.

The control device described herein may be a device on the network side itself or a processing circuit in the device on the network device. The device on the network side may be for example a cell base station or a center device for controlling.

Corresponding to the description for the measurement device 100 with reference to FIG. 2 above, the control device 200 determines a suitable measurement scheme with respect to the target measurement object and the user terminal, transmits measurement configuration information containing the measurement scheme to the user terminal, and receives a measurement result from the user terminal. After receiving the measurement result, the determining unit 201 determines the measurement result in different protocol layers based on a selection for the measurement scheme, that is, subjects the measurement result to the parsing in different protocol layers.

For example, the determining unit 201 is configured to determine the measurement result of the user terminal in the physical layer if the determined measurement scheme is the first measurement scheme. The determining unit 201 is configured to determine the measurement result of the user terminal in a high layer above the physical layer if the determined measurement scheme is the second measurement scheme.

The control device 200 can realize suitable measurement control in various cases by distinguishing the measurement scheme.

The notifying unit 202 is further configured to notify the user terminal of a physical channel configured for reporting the measurement result if the determined measurement scheme is the first measurement scheme. Specifically, the receiving unit 203 is configured to receive the measurement result from the user terminal through the physical channel. As described above, the physical channel includes at least one of a Physical Uplink Control Channel (PUCCH) in the LTE system and an uplink dedicated physical control channel (UL-DPCCH) in the UMTS system. It should be understood that the type of the physical channel is not limited thereto, and can be set according to a different type of system. Information on the physical channel can be transmitted separately, or can be included in the measurement configuration information to be transmitted. Of course, the control device 200 can schedule a physical data channel for the user terminal as described above, rather than configuring the physical channel, to transmit the measurement result.

Specifically, the notifying unit 202 may transmit a downlink control signaling to the user terminal to notify the user terminal of the determined measurement scheme. As described above, the downlink control signaling is for example an RRCConnectionReconfiguration message in the LTE system. Information on the measurement scheme in the present disclosure may be included in for example MeasObjectEUTRA.

The measurement configuration information containing the measurement scheme described above includes a measurement scheme identifier for indicating a measurement scheme to be applied. As an example, the measurement scheme identifier includes a measurement type for the target measurement object indicating the measurement scheme. When the measurement type is of a first type, it indicates that the measurement scheme is the first measurement scheme, and otherwise, it indicates that the measurement scheme is the second measurement scheme. The user terminal determines which measurement scheme is selected by the control terminal based on the measurement scheme identifier. In the case that the information on the measurement scheme is carried in the MeasObjectEUTRA information element described above, the measurement scheme identifier may be for example an ObjectType field. For example, the ObjectType field may be one of "Normal" and "Light". the "Normal" indicates that the second measurement scheme is used, the "Light" indicates that the first measurement scheme is used.

In the case that there are multiple target measurement objects, the determining unit 201 is configured to determine a measurement scheme for each of the multiple target measurement objects respectively, and the notifying unit 202 is configured to provide the measurement scheme to the corresponding user terminal.

In the case that the determining unit 201 determines to use the first measurement scheme, the receiving unit 203 can be configured to receive the measurement result of a target measurement object having the best communication quality. Or, the receiving unit 203 may also be configured to receive measurement results of all the target measurement objects sequentially.

In another aspect, in the case that the determining unit 201 determines to use the second measurement scheme, the receiving unit 203 may be configured to receive the measurement result through the physical data channel. In this case, since the measurement result is included in a data packet, corresponding to the user side, the control device performs for example FEC decoding on the received data, and uses the HARQ mechanism, to transmit a retransmission request if necessary to read a high-layer signaling.

As shown in FIG. 5, the control device 300 for the wireless network according to another embodiment of the present disclosure further includes an information acquiring unit 301 besides the respective units or components shown with reference to FIG. 4. The information acquiring unit 301 is configured to acquire information on a target network operation type corresponding to the target measurement object and information on capability of the user terminal. Specifically, the determining unit 201 is configured to determine the measurement scheme based on the information acquired by the information acquiring unit 301.

Specifically, the various information described here has the same meaning as the corresponding information mentioned in the description about the measurement device 100 described above, and will not be described repeatedly any more. It should be noted that the information acquiring unit 301 can acquire, from the user terminal, the information on the capability of the user terminal, while acquire, from another component such as a related memory, the information on the target network operation type. However, the information acquiring unit 301 can also acquire these pieces of information in any other way, which is not limited thereto.

In an embodiment, the target measurement object is a carrier. In the case that the information on the target network operation type indicates that the target network operation type is a type that baseband processing units are centralized and transceiver units are distributed for multiple carriers, and the user terminal can support the measurement scheme related to the target network operation type, the determining unit 201 is configured to determine the measurement scheme in a way as follows: the first measurement scheme is used with respect to a target measurement carrier which is located in the same baseband processing unit as a current serving carrier of the user terminal; and the second measurement scheme is used with respect to the other target measurement carriers.

As described above, since the relationship between the baseband processing of a cell corresponding to the target measurement carrier and the base processing of the current serving cell is different in the two cases, a measurement scheme is selected based on the difference, and the received measurement result is determined (or parsed) in different protocol layers, thereby reducing the processing complexity and improving the measuring efficiency.

As an example, the type that the baseband processing units are centralized and the transceiver units are distributed for multiple carriers includes a manner of C-RAN.

In the case that the determining unit 201 determines to use the first measurement scheme, the notifying unit 202 is further configured to provide auxiliary measurement information to the user terminal. The auxiliary measurement information includes at least one of the following: a type of wireless access technology for the target measurement carrier, an ID of a cell corresponding to the target measurement carrier, and time-frequency information on a synchronous channel or a searching channel of the target measurement carrier. It should be understood that the auxiliary measurement information is not limited thereto.

Furthermore, in the case that the determining unit 201 determines to use the first measurement scheme, the information acquiring unit 301 is further configured to acquire the time-frequency information of the synchronous channel or the searching channel of the target measurement carrier, and the notifying unit 202 is further configured to notify the user terminal of a measurement gap determined based on the time-frequency information. The user terminal is required not to transmit or receive any other information within the measurement gap. A description for the measurement gap can refer to the description for the measuring device 100 above, which is not described repeatedly here any more.

Similarly, the determining unit 201 may be configured to determine measurement schemes for multiple target measurement carriers, respectively. In the case that the measurement scheme is the first measurement scheme, the receiving unit 203 may receive the measurement results in various ways mentioned above, or may preferentially receive the measurement result of the current serving carrier of the user terminal. A specific example of the measurement result is for example described above, and is not described repeatedly here any more.

While the information described above indicates that the target network operation type is not the type that the baseband processing units are centralized and the transceiver units are distributed for multiple carrier, and/or the user terminal can not support the measurement scheme related to the type, the determining unit 201 is configured to determine to use the second measurement scheme.

It can be seen that the control device 200 or the control device 300 may select a suitable measurement scheme for different measurement objects and different user terminals, thereby increasing the measuring efficiency and improving service experience of the user terminal.

In a process of describing the measurement device for the wireless network and the control device for the wireless network in the embodiments described above, it is obvious that some processing and methods are also disclosed. Hereinafter, overviews of the methods are given without repeating details discussed above. It should be noted that although the methods are disclosed in the process of describing the measurement device for the wireless network and the control device for the wireless network, the methods do not certainly employ or are not certainly executed by the aforementioned components. For instance, embodiments of the measurement device for the wireless network and the control device for the wireless network may be partially or completely achieved by hardware and/or firmware, and the measurement method for the wireless network and control method for the wireless network described below may be fully achieved by a computer-executable program, although the methods may employ the hardware and/or firmware of the measurement device for the wireless network and the control device for the wireless network.

Figure 6:
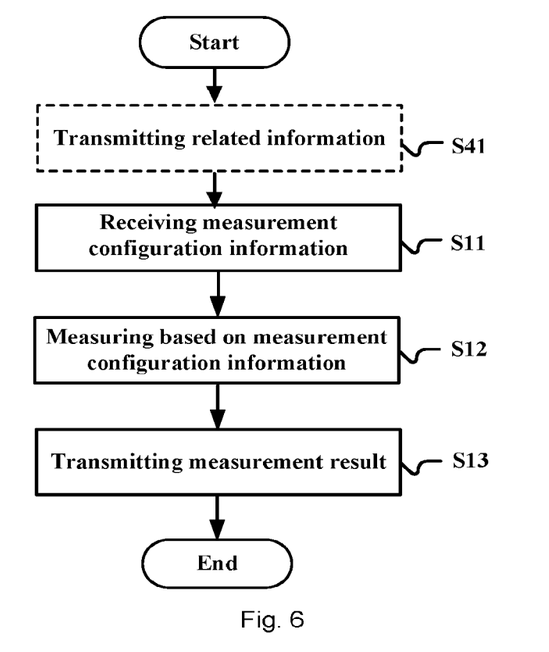
FIG. 6 is a flow diagram of a measurement method according to an embodiment of the present disclosure.

FIG. 6 shows a flow diagram of a measurement method for a wireless network according to an embodiment of the present disclosure. The measurement method includes: receiving measurement configuration information containing a measurement scheme for a target measurement object from a control terminal (S11); measuring the target measurement object based on the received measurement configuration information (S12); and transmitting a measurement result to the control terminal (S13), where a measurement result processed in different communication protocol layers is transmitted in response to the measurement scheme included in the measurement configuration information being a first measurement scheme or a second measurement scheme.

As an example, if the measurement scheme is the first measurement scheme, the measurement result is not provided to a high layer above the physical layer to process in step S12, and the measurement result not processed by the high layer in step S12 is transmitted to the control terminal in step S13.

In addition, if the measurement scheme is the second measurement scheme, the measurement result is provided to the high layer above the physical layer to process in step S12, and the measurement result subjected to the processing of the high layer in step S12 is transmitted to the control terminal in step S13.

In the case that the measurement scheme is the first measurement scheme, configuration information on a physical channel for transmitting the measurement result is received from the control terminal in step S11, and the measurement result is transmitted through the physical channel in step S13. As described above, the configuration information on the physical channel may be transmitted separately, or may be included in the measurement configuration information to be transmitted.

In the case that the measurement scheme is the second measurement scheme, the measurement result is transmitted through a physical data channel in step S13.

In addition, as shown in a dotted block in FIG. 6, the measurement method may further include, before step S11, the following step: transmitting information on capability of the user terminal to the control terminal (S41). In this situation, the measurement configuration information received in step S11 is determined by the control terminal at least based on the information on the capability of the user terminal.

In an example, the target measurement object is a carrier. In the case that a target network operation type is a type that baseband processing units are centralized and transceiver units are distributed for multiple carriers, and the information on the capability of the user terminal in step S41 indicates that the user terminal can support the measurement scheme related to the target network operation type, the measurement scheme included in the measurement configuration information received in step S11 is the first measurement scheme if the target measurement carrier is located in the same baseband processing unit as a current serving carrier of the user terminal, otherwise the measurement scheme included in the measurement configuration information received in step S11 is the second measurement scheme. In another aspect, in the case that the target network operation type is not the type that baseband processing units are centralized and transceiver units are distributed for multiple carriers, and/or the information on the capability of the user terminal in step S41 indicates that the user terminal can not support the measurement scheme related to the target network operation type, the measurement scheme included in the measurement configuration information received in step S11 is the second measurement scheme.

In the case that the measurement scheme is the first measurement scheme, auxiliary measurement information is further received from the control terminal in step S11. In addition, in this situation, a measurement gap set by the control terminal based on time-frequency information of a synchronous channel or a searching channel of the target measurement object is also received from the control terminal in step S11, and an antenna of the user terminal is readjusted based on the measurement gap and the target measurement object is measured in step S12. The user terminal is required not to transmit and receive any other information within the measurement gap of the user terminal.

In addition, the above mentioned steps S11 to S12, or steps S41 and S11 to S12 can be performed for multiple target measurement objects. In the case that the measurement scheme is the first measurement scheme, a measurement result of a target measurement object having the best communication quality is transmitted to the control terminal in step S13, or measurement results of all of the multiple target measurement objects are transmitted to the control terminal sequentially.

Figure 7:
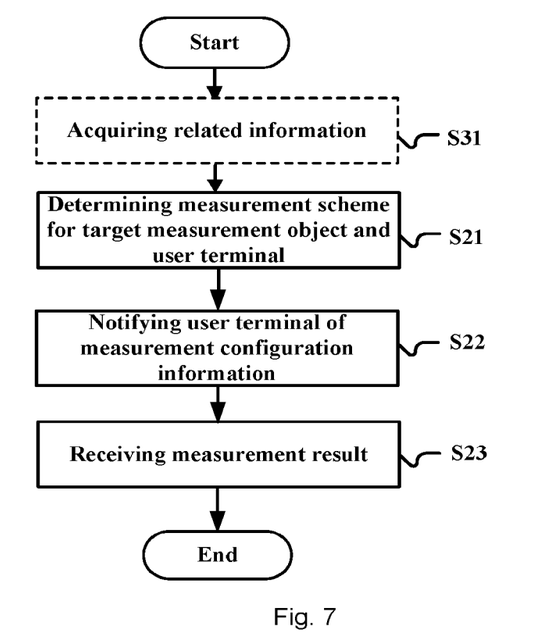
FIG. 7 is a flow diagram of a control method according to an embodiment of the present disclosure.

FIG. 7 is a flow diagram of a control method for a wireless network according to an embodiment of the present disclosure. The control method includes: with respect to a target measurement object and a user terminal, determining a measurement scheme of the user terminal for the target measurement object from multiple candidate measurement schemes containing a first measurement scheme and a second measurement scheme (S21); notifying the user terminal of measurement configuration information containing the determined measurement scheme for the target measurement object (S22); and receiving a measurement result reported by the user terminal (S23). The received measurement result of the user terminal is determined in different communication protocol layers in response to the determined measurement scheme being the first measurement scheme or the second measurement scheme.

As an example, if the determined measurement scheme is the first measurement scheme, the measurement result of the user terminal is determined in the physical layer. If the determined measurement scheme is the second measurement scheme, the measurement result of the user terminal is determined in a high layer above the physical layer.

If the determined measurement scheme is the first measurement scheme, the user terminal is further notified of a physical channel configured for reporting the measurement result in step S22. Specifically, the measurement result is received from the user terminal through the physical channel in step S23. As described above, configuration information on the physical channel may be transmitted separately, or may be included in the measurement configuration information to be transmitted.

In the case that the determined measurement scheme is the second measurement scheme, the measurement result is received through a physical data channel in step S13.

In addition, as shown in a dotted block in FIG. 7, the control method may further include, before step S21, the following step: acquiring information on a target network operation type corresponding to the target measurement object and information on capability of the user terminal (S31). Specifically, the measurement scheme is determined based on the acquired information in step S21.

In an example, the target measurement object is a carrier. In the case that information acquired in step S31 indicates that the target network operation type is a type that baseband processing units are centralized and transceiver units are distributed for multiple carriers, and the user terminal can support the measurement scheme related to the target network operation type, the measurement scheme is determined in step S21 in a way as follows: with respect to the target measurement carrier which is located in a same baseband processing unit as a current serving carrier of the user terminal, the first measurement scheme is used; otherwise, the second measurement scheme is used. In another aspect, in the case that the information acquired in step S31 indicates that the target network operation type is not the type that the baseband processing units are centralized and the transceiver units are distributed for multiple carriers, and/or the user terminal can not support the measurement scheme related to the target network operation type, it is determined to use the second measurement scheme in step S21.

In the case that the measurement scheme is the first measurement scheme, auxiliary measurement information is also provided to the user terminal in step S22. In addition, in this situation, time-frequency information of a synchronous channel or a searching channel of the target measurement carrier is acquired in step S31, and a measurement gap set based on the time-frequency information is provided to the user terminal in step S22, The user terminal is required not to transmit and receive any other information within the measurement gap of the user terminal.

In addition, the above mentioned steps S21 to S22, or steps S31 and S21 to S22 can be performed for multiple target measurement objects. In the case that the measurement scheme is the first measurement scheme, a measurement result of a target measurement object having the best communication quality is received in step S23, or measurement results of all of the multiple target measurement objects are received sequentially.

Furthermore, as described above, the physical channel may include at least one of a Physical Uplink Control Channel (PUCCH) in the LTE system and an uplink dedicated physical control channel (UL-DPCCH) in the UMTS system in the two methods described above. The type that the baseband processing units are centralized and the transceiver units are distributed for multiple carriers includes a manner of C-RAN. The auxiliary measurement information includes at least one of the following: a type of wireless access technology for the target measurement carrier, an ID of a cell corresponding to the target measurement carrier, and time-frequency information on a synchronous channel or a searching channel of the target measurement carrier. The measurement configuration information is included in a downlink control signaling from the control terminal. The measurement configuration information includes a measurement scheme identifier for indicating the measurement scheme to be applied. As an example, the measurement scheme identifier includes a measurement type for the target measurement object indicating the measurement scheme. It is determined to use the first measurement scheme in the case that the measurement type for the target measurement object is a first type, and otherwise it is determined to use the second measurement scheme. These aspects have been described in detail in a process of describing the measurement device, which is not described repeatedly here any more.

In summary, with the measurement method and/or the control method according to the present disclosure, a suitable measurement scheme can be selected based on a type of the target measurement object and a type of the user terminal, thereby simplifying the measuring process as much as possible, reducing complexity and increasing the measuring quality, and further improving network performance and service experience of the user terminal.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that for example the measuring unit and the determining unit described above may be implemented by one or more processors, and for example the transmitting unit, the receiving unit, the notifying unit, the information acquiring unit and so on can be implemented by a circuit element such as an antenna, a filter, a modem and a codec.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 800 shown in FIG. 8) from a storage medium or network, wherein the computer is capable of implementing various functions when installed with various programs.

Figure 8:
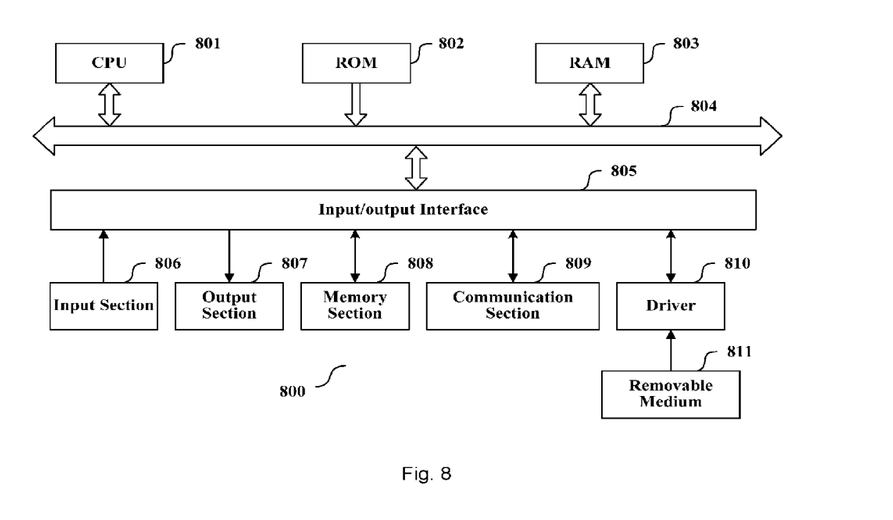
FIG. 8 is an exemplary block diagram illustrating the structure of a general purpose personal computer capable of realizing the method and/or apparatus and/or system according to the embodiments of the present invention.

In FIG. 8, a central processing unit (CPU) 801 executes various processing according to a program stored in a read-only memory (ROM) 802 or a program loaded to a random access memory (RAM) 803 from a memory section 808. The data needed for the various processing of the CPU 801 may be stored in the RAM 803 as needed. The CPU 801, the ROM 802 and the RAM 803 are linked with each other via a bus 804. An input/output interface 805 is also linked to the bus 804.

The following components are linked to the input/output interface 805: an input section 806 (including keyboard, mouse and the like), an output section 807 (including displays such as a cathode ray tube (CRT), a liquid crystal display (LCD), a loudspeaker and the like), a memory section 808 (including hard disc and the like), and a communication section 809 (including a network interface card such as a LAN card, modem and the like). The communication section 809 performs communication processing via a network such as the Internet. A driver 810 may also be linked to the input/output interface 805, if needed. If needed, a removable medium 811, for example, a magnetic disc, an optical disc, a magnetic optical disc, a semiconductor memory and the like, may be installed in the driver 810, so that the computer program read therefrom is installed in the memory section 808 as appropriate.

In the case where the foregoing series of processing is achieved through software, programs forming the software are installed from a network such as the Internet or a memory medium such as the removable medium 811.

It should be appreciated by those skilled in the art that the memory medium is not limited to the removable medium 811 shown in FIG. 8, which has program stored therein and is distributed separately from the apparatus so as to provide the programs to users. The removable medium 811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 802 and the memory section 808 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A measurement device, comprising:
processing circuitry configured to
   receive measurement configuration information including a measurement scheme for a target measurement object from a control terminal;
   measure the target measurement object based on the measurement configuration information; and
   transmit, to the control terminal, a measurement result processed by different communication protocol layers in response to whether the measurement scheme is a first measurement scheme or a second measurement scheme, wherein
when the measurement scheme is the first measurement scheme, the processing circuitry does not provide the measurement result to a high layer above a physical layer for processing prior to the processing circuitry transmitting the measurement result to the control terminal, and
when the measurement scheme is the second measurement scheme, the processing circuitry provides the measurement result to the high layer above the physical layer for processing prior to the processing circuitry transmitting the measurement result to the control terminal.

2. The measurement device according to claim 1, wherein when the measurement scheme is the first measurement scheme, the processing circuitry is further configured to
   receive configuration information on a physical channel for transmitting the measurement result from the control terminal, and
   transmit the measurement result through the physical channel configured by the control terminal.

3. The measurement device according to claim 2, wherein the processing circuitry is configured to transmit a measurement result of a target measurement object having the best communication quality to the control terminal when the measurement scheme is the first measurement scheme.

4. The measurement device according to claim 2, wherein the processing circuitry is configured to transmit measurement results of all of the plurality of target measurement objects to the control terminal sequentially when the measurement scheme is the first measurement scheme.

5. The measurement device according to claim 2, wherein the physical channel comprises at least one of a Physical Uplink Control Channel (PUCCH) in a LTE system and an uplink dedicated physical control channel (UL-DPCCH) in a universal mobile telecommunications system (UMTS) system.

6. The measurement device according to claim 1, wherein the processing circuitry is further configured to receive auxiliary measurement information from the control terminal when the measurement scheme is the first measurement scheme.

7. The measurement device according to claim 6, wherein the auxiliary measurement information comprises at least one of the following: a type of wireless access technology for the target measurement object, an ID of a cell corresponding to the target measurement object and time-frequency information on a synchronous channel or a searching channel of the target measurement object.

8. The measurement device according to claim 1, wherein when the measurement scheme is the first measurement scheme, the processing circuitry is further configured to
receive, from the control terminal, a measurement gap set by the control terminal based on time-frequency information of a synchronous channel or a searching channel of the target measurement object, and
readjust an antenna of a user terminal based on the measurement gap and perform the measuring, wherein the user terminal is required not to transmit and receive any other information within the measurement gap of the user terminal.

9. The measurement device according to claim 1, wherein the measurement configuration information is comprised in a downlink control signaling from the control terminal.

10. The measurement device according to claim 1, wherein the measurement configuration information containing the measurement scheme comprises a measurement scheme identifier for indicating a measurement scheme to be applied.

11. The measurement device according to claim 10, wherein
the measurement scheme identifier comprises a measurement type for the target measurement object indicating a measurement scheme, and
the processing circuitry determines to use the first measurement scheme when the measurement type for the target measurement object is of a first type, otherwise the processing circuitry determines to use the second measurement scheme.

12. The measurement device according to claim 1, wherein the processing circuitry is configured to measure a plurality of target measurement objects based on their respective measurement schemes, respectively.

13. The measurement device according to claim 1, wherein when the measurement scheme is the second measurement scheme, the processing circuitry is configured to transmit the measurement result through a physical data channel.

14. A measurement method for a wireless network, comprising:
receiving, by processing circuitry measurement configuration information including a measurement scheme for a target measurement object from a control terminal;
measuring, by the processing circuitry, the target measurement object based on the measurement configuration information; and
transmitting, by the processing circuitry to the control terminal, a measurement result processed by different communication protocol layers is transmitted in response to whether the measurement scheme is a first measurement scheme or a second measurement scheme, wherein
when the measurement scheme is the second measurement scheme, the method further comprises providing, by the processing circuitry, the measurement result to a high layer above a physical layer for processing prior to the transmitting of the measurement result to the control terminal, and
when the measurement scheme is the first measurement scheme, the processing circuitry does not provide the measurement result to the high layer above the physical layer for processing prior to the transmitting of the measurement result to the control terminal.

15. A control device, comprising:
processing circuitry configured to
determine, with respect to a target measurement object and a user terminal, a measurement scheme of the user terminal for the target measurement object from multiple candidate measurement schemes including a first measurement scheme and a second measurement scheme;
notify the user terminal of measurement configuration information including the determined measurement scheme for the target measurement object; and
receive a measurement result reported by the user terminal, wherein
the processing circuitry parses the measurement result of the user terminal in different communication protocol layers according to whether the measurement scheme is a first measurement scheme or a second measurement scheme, and
the user terminal is configured to
when the measurement scheme is the first measurement scheme, the not provide the measurement result to a high layer above a physical layer for processing prior to transmitting the measurement result to the control device, and
when the measurement scheme is the second measurement scheme, provide the measurement result to the high layer above the physical layer for processing prior to transmitting the measurement result to the control device.

16. The control device according to claim 15, wherein the processing circuitry is configured to
parse the measurement result of the user terminal in the physical layer when the measurement scheme is the first measurement scheme, and
parse the measurement result of the user terminal in the high layer above the physical layer when the measurement scheme is the second measurement scheme.

17. The control device according to claim 15, wherein the processing circuitry is further configured to
acquire information on a target network operation type corresponding to the target measurement object and information on capability of the user terminal, and determine the measurement scheme based on the information on the target network operation type.

18. A control method, comprising:

determining, by processing circuitry of a control device with respect to a target measurement object and a user terminal, a measurement scheme of the user terminal for the target measurement object from multiple candidate measurement schemes including a first measurement scheme and a second measurement scheme;

notifying the user terminal of measurement configuration information including the determined measurement scheme for the target measurement object;

receiving a measurement result reported by the user terminal; and parsing, by the processing circuitry, the measurement result of the user terminal in different communication protocol layers according to whether the measurement scheme is a first measurement scheme or a second measurement scheme, wherein the user terminal is configured to
when the measurement scheme is the first measurement scheme, the not provide the measurement result to a high layer above a physical layer for processing prior to transmitting the measurement result to the control device, and
when the measurement scheme is the second measurement scheme, provide the measurement result to the high layer above the physical layer for processing prior to transmitting the measurement result to the control device.

* * * * *